May 12, 1970 V. E. MATTER 3,511,105
HYDROSTATIC TRANSMISSION DRIVE PUMP SWASH PLATE CONTROL
Filed July 2, 1968
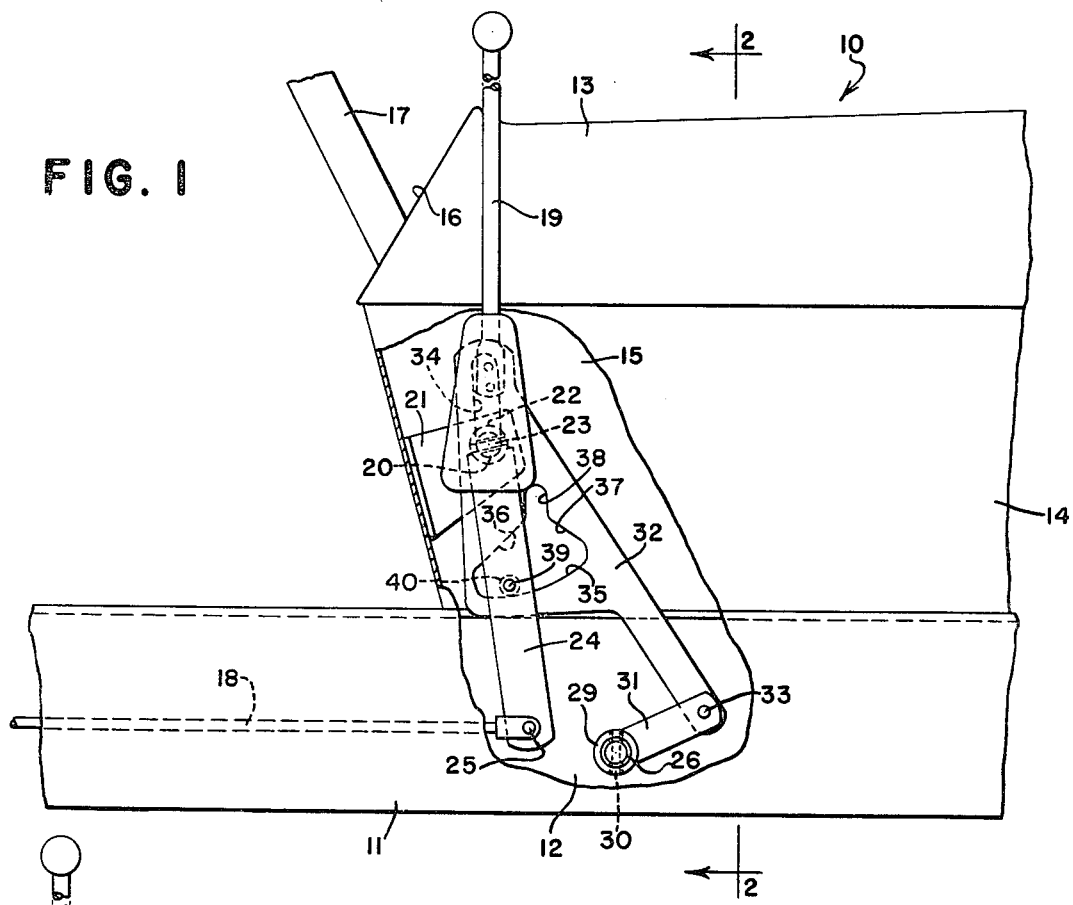
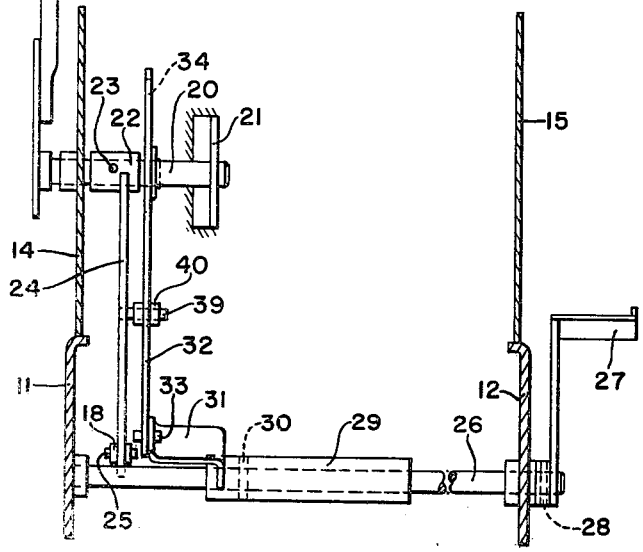
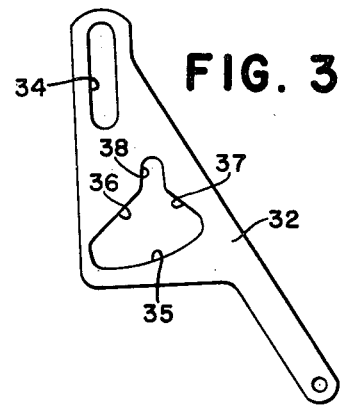
*INVENTOR.*
VERN E. MATTER

3,511,105
HYDROSTATIC TRANSMISSION DRIVE PUMP SWASH PLATE CONTROL

Vern Earl Matter, Horicon, Wis., assignor to Deere & Company, Moline, Ill., a corporation of Delaware
Filed July 2, 1968, Ser. No. 741,921
Int. Cl. G05g 11/00
U.S. Cl. 74—481                               5 Claims

ABSTRACT OF THE DISCLOSURE

A speed control return cam is linked to the brake or clutch pedal of a tractor having a hydrostatic transmission. The return cam is provided with a pair of upwardly converging cam surfaces which will contact a cam follower on the speed control lever when the return cam is moved downwardly by depression of the pedal. After the cam follower has been contacted by one of the cam surfaces, additional depression of the pedal will cause the cam follower to be moved to a position in the apex of the upwardly converging cam surfaces and to move the speed control lever to a neutral position from either a forward or reverse position.

BACKGROUND OF THE INVENTION

The present invention relates generally to the controls for the drive pump swash plate of a hydrostatic transmission and more particularly to a cam which is linked to the clutch or brake pedal of the vehicle and which will return a manual control lever to a neutral position when the clutch or brake pedal is depressed.

In a vehicle such as tractor which is provided with a hydrostatic transmission, the control of the speed and direction of movement of the vehicle is generally accomplished by movement of the drive pump swash plate to provide variable output of the pump as well as to vary the directional flow of fluid to vary the direction of rotation of the associated fluid motor. The movement of the swash plate is generally accomplished through the use of a hand lever which is pivotally mounted intermediate its ends to the tractor and is linked to the swash plate to cause movement of the swash plate whenever the control lever is moved. Through the use of this single control lever it is possible to brake the vehicle as well as change its speed and direction of movement.

However, the hand lever does not by itself provid sufficient control of the tractor. This is generally due to the fact that the operator of the tractor is acccustomed to having a vehicle with foot-operated controls, and in an emergency situation is likely to forget about the hand lever and attempt to control the tractor with non-existent foot-operated controls. Therefore it is necessary to provide the tractor with a foot-operated clutch or brake as well as the control lever. This in turn requires some interlock between the foot controls and the hand lever so that in the event the operator attempts to stop the tractor with the foot controls and fails to move the control lever to a neutral position depression of the clutch or brake pedal will automatically return the control lever to the neutral position. Without such an interlock, attempts to stop the tractor without moving the control lever to a neutral position could result in failure of the tractor components or an injury to the tractor operator. For example, if the tractor is only provided with a brake it would be necessary for the brake to work against the engine power transmitted to the tractor wheels as well as against the momentum of the tractor. If the tractor is only provided with a clutch, and was stopped through the use of the clutch without returning the hydrostatic control lever to neutral the operator may well forget and engage the clutch when the control lever is still in a "fast" operative position so that the tractor would again begin to move with a sudden jerk.

SUMMARY OF THE INVENTION

An object of the present invention is to provide a cam means which is operable through depression of either a clutch or brake pedal to return the control lever for a hydrostatic transmission to a neutral position.

Another object of the present invention is to provide a cam means which is linked to a brake pedal and is operative upon depression of the pedal to return the control of a hydrostatic transmission to a neutral position before the brake is engaged.

Still another object of the present invention is to provide a cam means which is linked to a clutch pedal and is operative to return the control lever for a hydrostatic transmission to a neutral position simultaneously with the disengagement of the clutch.

A further object of the present invention is to provide a cam means which can be linked to either a clutch or brake pedal and is operative upon depression of the pedal to return the control lever for a hydrostatic transmission to a neutral position, and which locks the control lever in the neutral position as long as the brakes are applied or the clutch is disengaged.

Yet another object of the present invention is to provide a cam means to return the control lever for a hydrostatic transmission to a neutral position, and which is of simple yet rugged construction and which can be linked to either a clutch or brake pedal without modification.

The above objects are accomplished by providing a cam link which is attached to the free end of a crank arm secured to a rockshaft for a clutch or brake. The upper end of the link has an elongated generally vertically extending slot which receives the pivot shaft of the control lever for the hydrostatic transmission so that as the clutch or brake pedal is depressed the crank arm will pull the link generally downwardly. Intermediate its length the link is provided with a large generally triangular-shaped opening, the sides of which provide a pair of upwardly converging cam surfaces. A cam follower projects laterally from the control lever and extends through the cutout so that as the link is moved downwardly one of the cam surfaces will contact the follower and move the control lever to a neutral position.

A second generally vertically extending elongated slot communicates with the generally triangular-shaped opening in the link at the apex of the pair of cam surfaces so that when the link is secured to a brake rockshaft the cam follower moves into this slot as the brakes are applied and when the link is secured to a clutch rockshaft the cam follower moves into the slot to permit the final movement necessary for total disengagement of the clutch. The second generally vertically extending slot also locks the control lever in a neutral position as long as the brakes are applied or the clutch is disengaged.

The above and additional objects will become apparent along with the details of construction from a reading of the following detailed description when taken in conjunction with the accompanying drawing.

BRIEF DESCRIPTION OF THE DRAWING

In the drawing:

FIG. 1 is a side elevational view of a portion of a tractor, with a section broken away to illustrate hidden parts;

FIG. 2 is a sectional view taken substantially along the line 2—2 of FIG. 1; and FIG. 3 is a side elevational view of one of the parts illustrated in FIGS. 1 and 2.

DESCRIPTION OF THE PREFERRED EMBODIMENT

Referring to the drawing, a portion of a tractor is indicated generally at 10 and includes conventional main frame members 11 and 12, a hood 13, side walls 14 and 15, instrument panel 16, and a steering column 17. The tractor illustrated is driven by a conventional hydrostatic transmission (not disclosed) which includes the conventional drive pump drivingly connected to the tractor engine and a fluid motor which is drivingly connected to the rear wheels of the tractor. The speed and direction of movement of the tractor are controlled by varying the position of the swash plate which forms part of the conventional drive pump, and the position of the swash plate is controlled by fore-and-aft movement of a control rod 18.

The fore-and-aft movement of the control rod 18 can be controlled by the tractor operator through a hand lever 19 which is positioned along one side of the tractor and is mounted on a short rockshaft 20. The rockshaft 20 is supported by and journaled in the side wall 14 and a bracket 21 which is mounted on any suitable portion of the tractor structure. A sleeve 22 is mounted on the rockshaft 20, is fixed for rotation therewith by a pin 23, and carries a depending crank arm 24. The control rod 18 is pivotally secured to the crank arm 24 at the lower end thereof by a pivot pin 25. The control lever 19 is movable forwardly and rearwardly of a neutral position which corresponds to the neutral position of the drive pump swash plate. Forward movement of the control lever 19 from the neutral position will cause forward movement of the tractor, while rearward movement of the control lever 19 causes rearward movement of the tractor.

The tractor 10 is also provided with a transversely extending rockshaft which is supported by an journaled in the frame members 11 and 12. As will be explained hereinafter, the rockshaft 26 is used to control either a clutch in a drive line between the tractor engine and the transmission, or the tractor brakes. Movement of the rockshaft 26 is controlled by the operator through a pedal 27 which is mounted on the rockshaft 26 and held in position thereon by a pin 28. A sleeve 29 is mounted on the rockshaft 26 between the frame members 11 and 12 and is fixed for rotation with the rockshaft 26 by a pin 30.

The pedal 27 and rockshaft 26 can be used to return the control lever 19 to and lock the control lever 19 in the neutral position. This is accomplished through a crank arm 31 and a cam link 32. The crank arm 31 is fixed to the sleeve 29 and extends generally forwardly therefrom. The lower end of the cam link 32 is pivotally secured to the free end of the crank arm 31 by a pivot pin 33. The upper end of the cam link 32 is provided with a generally vertically extending elongated slot 34 through which the rockshaft 20 passes. With the rockshaft 20 extending through the elongated slot 34 the movement of the upper end of the cam link 32 is limited to substantially vertical movement. Intermediate its ends, the cam link 32 is provided with a large opening, which is of generally triangular shape. The bottom of the triangular-shaped opening provides a slight concave surface 35, and the sides of the triangular-shaped opening provide a pair of upwardly converging cam surfaces 36 and 37. For a reason which will be explained hereinafter, a second generally vertically extending elongated slot 38 communicates with the triangular-shaped opening at the apex of the pair of upwardly converging cam surfaces 36 and 37. A cam follower is mounted on the downwardly projecting crank arm 24 and includes a laterally projecting pin 39 which extends through the triangular-shaped opening in the cam link 32 and a roller 40 mounted on the pin 39.

As can be seen in FIG. 1, the control lever 19 can be moved forwardly and rearwardly without interference from the cam link 32 since the cam roller 40 follows the concave lower surface of the triangular-shaped opening. However, if the control lever 19 is not in its neutral position, depression of the pedal 27 will cause the cam link 32 to move generally downwardly so that one of the cam surfaces 36 or 37 will contact the roller 40 and cause the control lever 19 to be moved to a neutral position. For example, if the control lever 19 is moved forwardly of the neutral position, downward movement of the link 32 will cause the cam surface 36 to contact the roller 40 and as the link 32 continues to move downwardly the roller 40 will be moved up along the cam surface 36 until the roller 40 enters the slot 38. When the roller 40 is within the slot 38 the control lever 19 is locked in a neutral position until such time as the pedal 27 is released and the link 32 is moved upwardly so that the roller 40 is free to move along the lower concave surface 35 of the triangular-shaped opening. When the control lever 19 is moved rearwardly of the neutral position, downward movement of the cam link 32 will cause the cam surface 37 to contact the roller 40 and move the control lever 19 back to the neutral position.

The pedal 27 and rockshaft 26 are also preferably used to provide additional controls for the tractor. For example, the pedal 27 and rockshaft 26 can be used to control either a clutch provided in the drive line between the tractor engine and transmission, or it can be used to control conventional brakes.

If the pedal 27 and rockshaft 26 are used to control the tractor brakes, an additional crank arm is mounted on the rockshaft 26 and is connected to the brakes through a rod extending between the brakes and the crank arm. A lost motion connection would also be provided between the crank arm and the rod so that the brakes would not be engaged until the cam link 32 was moved downwardly a sufficient amount to move the control lever 19 to the neutral position. The brakes would then begin to be applied as the roller 40 moved into the slot 38. With this connection, the brakes would not be engaged until all the power was disconnected from the wheels and the brakes would not have to work against the power of the tractor engine, but only against the momentum of the tractor.

If the pedal 27 and rockshaft 26 are used to disengage a clutch in the drive line between the tractor engine and transmission, a throw-out arm could be mounted on the sleeve 29. With a clutch throw-out arm mounted on the sleeve 29, depression of the pedal 27 would simultaneously cause the throw-out arm to disengage the clutch and the link 32 to move the control lever 19 to the neutral position. The slot 38 and the cam link 32 would allow for additional movement of the pedal 27 and rockshaft 26 to insure complete disengagement of the clutch, as well as locking the control arm 19 in a neutral position as long as the clutch was disengaged. With this setup, the tractor operator could not stop the tractor by disengagement of the clutch without returning the control lever 19 to the neutral position, and thus the clutch could not be engaged while the control lever was in one of its operative positions so that the tractor could not start off with a sudden jerk.

I claim:

1. In the combination of a vehicle having a hydrostatic transmission, a control lever pivotally mounted intermediate its length to said vehicle on a transversely extending shaft and linked to the drive pump swash plate of said transmission for control of said swash plate, a foot-operated control device for said tractor, said control device including a rockshaft journaled on said tractor, the improvement comprising: a cam follower on said control lever, a crank arm on said rockshaft, link means secured to said crank arm, and cam means carried by said link means, said cam means being normally free from engagement with said cam follower and operative upon actuation of said control device to engage said cam follower and move said control lever to a neutral position.

2. The combination as set forth in claim 1 wherein said rockshaft is located below said transversely extending shaft, said link means extends generally upwardly to said transversely extending shaft, and said link means is provided with a generally vertically extending elongated slot at the upper end thereof which receives said transversely extending shaft and limits said link means to generally vertical movement upon actuation of said control device.

3. The combination as set forth in claim 2 wherein said cam means provides a pair of upwardly converging cam surfaces, said cam follower is normally free for movement between the lower ends of said surfaces to allow free movement of said control lever, and one of said surfaces contacts said cam follower upon downward movement of said link means to return said control lever to the neutral position.

4. The combination as set forth in claim 3 wherein a generally triangular-shaped opening is provided in said link means intermediate its length, the sides of said triangular-shaped opening constituting said upwardly converging cam surfaces.

5. The combination as set forth in claim 4 wherein a second generally vertically extending elongated slot is provided in said link means and communicates with said generally triangular-shaped opening at the apex of said pair of cam surfaces whereby additional downward movement of said link means after said control lever has been moved to the neutral position will cause said cam follower to move into said last-mentioned slot to lock said control lever in the neutral position.

References Cited

UNITED STATES PATENTS

| | | | |
|---|---|---|---|
| 3,119,478 | 1/1964 | Ritter | 192—4 |
| 3,354,981 | 11/1967 | Swanson et al. | 180—77 |
| 3,431,792 | 3/1969 | Smith | 74—481 |
| 3,349,860 | 10/1967 | Ross | 180—6.44 |

MILTON KAUFMAN, Primary Examiner

U.S. Cl. X.R.

74—473